(12) United States Patent
Mattes

(10) Patent No.: US 6,249,492 B1
(45) Date of Patent: Jun. 19, 2001

(54) METHOD AND ARRANGEMENT FOR CONTROLLING THE DATA STREAM IN A VIBRATION-RESISTANT PLAYBACK DEVICE

(75) Inventor: Edmund Mattes, Spaichingen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/380,118

(22) PCT Filed: Feb. 14, 1998

(86) PCT No.: PCT/EP98/00849

§ 371 Date: Dec. 2, 1999

§ 102(e) Date: Dec. 2, 1999

(87) PCT Pub. No.: WO98/38639

PCT Pub. Date: Sep. 3, 1999

(30) Foreign Application Priority Data

Feb. 28, 1997 (DE) .............................................. 197 08 095

(51) Int. Cl.⁷ .............................. G11B 17/22; G11B 7/00
(52) U.S. Cl. ....................... 369/32; 369/47.15; 369/53.11
(58) Field of Search .................................... 369/32, 60.01, 369/24, 53.11, 47.15, 47.36, 47.1, 53.1

(56) References Cited

U.S. PATENT DOCUMENTS

| | | | |
|---|---|---|---|
| 5,471,442 | 11/1995 | Shimizume | 369/32 |
| 5,910,935 | * 6/1999 | Takagi et al. | 369/54 |
| 5,943,307 | * 8/1999 | Takagi et al. | 369/54 |
| 6,115,337 | * 9/2000 | Takagi et al. | 369/54 |

FOREIGN PATENT DOCUMENTS

| | | |
|---|---|---|
| 0649131 | 4/1995 | (EP) . |
| 2289158 | 11/1995 | (GB) . |

OTHER PUBLICATIONS

Patent Abstracts of Japan, vol. 097, No. 006 Jun. 30, 1997 JP 09 045002A (Sony Corp) Feb. 14, 1997.
Patent Abstracts of Japan, vol. 096, No. 007 Jul. 31, 1996 JP 08 077691A (Toshiba Corp) Mar. 22, 1996.
Patent Abstracts of Japan, vol. 013, No. 412 (P–932) Sep. 12, 1989 JP 01 151070A (Toshiba Corp) Jun. 13, 1989.

* cited by examiner

Primary Examiner—Ali Neyzari
(74) Attorney, Agent, or Firm—Joseph S. Tripoli; Paul P. Kiel

(57) ABSTRACT

Method and arrangement for controlling the data stream in a vibration-resistant playback device. In vibration-resistant playback devices, it is known to write the data to a buffer memory continually at a doubled rate and to read out the said data at a normal data rate. If no vibrations occur, artificial returns must be effected. This leads to an increased power consumption. The present invention enables a reading rate which can be adapted to the averaging of the periods of time when the information medium can and cannot be read. In order to enable processing of the data stream with such a variable reading rate, reading from a memory is switched over between a normal and doubled data rates and the processing stages are likewise correspondingly switched over. As a result, only information data is stored in a downstream buffer memory, so that a lower capacity is sufficient or, with the existing capacity, a longer time span can be bridged during which no data can be read.

10 Claims, 1 Drawing Sheet

METHOD AND ARRANGEMENT FOR CONTROLLING THE DATA STREAM IN A VIBRATION-RESISTANT PLAYBACK DEVICE

BACKGROUND OF THE INVENTION

1. Field of the Invention

The invention relates to a method and an arrangement for controlling the data stream in a vibration-resistant playback device.

2. Related Art

Particularly in the mobile use of playback devices of optical or other information media, vibration-resistant properties are required in order to ensure uninterrupted reproduction of information despite vibrations which lead to interruptions in the reading of data from the information medium.

In order to achieve a vibration-resistant behaviour, the data are written to a buffer memory at a rate which is higher than normal and are read out at the normal rate. If vibrations cause an interruption in the reading of data from the information medium, then this gap in the source data stream can be bridged by reading out the data reserve in the buffer memory which has been stored as a precaution in the meantime.

A method and an apparatur for reproducing data from a disk medium at a variable data rate and for converting the reproduced data to a constant data rate, already have been described in GB 2289158. The apparatus comprises: a reproducing head for reproducing the data from the disk medium at the variable data rate; buffer memory means for storing the reproduced data from the reproducing head and for reading out the stored data at a constant data rate; means for detecting overload of the buffer memory means; and servo means responsive to the overload detecting means for controlling the reproducing head to repeat reproduction of data from the disk medium when overload of the buffer memory means has been detected and the method comprises: storing in a buffer memory data reproduced form the disk medium by a reproducing head at a variable data rate; reading out the stored data from the buffer memory at a constant data rate; detecting overload of the buffer memory; and controlling the reproducing head to repeat reproduction of data from the disk medium when overload of the buffer memory has been detected.

In most of the commercially available devices, the reading of data from the information medium is realized at a doubled rate. However, during operation free from vibrations, this constantly leads to an overflow of the buffer memory, thereby necessitating artificial interruptions in the reading of data from the information medium or returns.

The always doubled rate and the jumps of the scanner cause an increased current consumption. In order to eliminate this disadvantage, it has already been proposed to carry out the reading of data from the information medium with a variable rate. In order not to have to perform the obligatory error checking and possible error correction and/or masking on a source data stream with a variable rate, in accordance with the proposal the requisite processing stages for these measures were connected downstream of the buffer memory. However, this requires an increased storage capacity or, with the existing storage capacity, reduces the useful data that can be stored since, after all, the check data have to be concomitantly stored as well as the useful data.

BRIEF SUMMARY OF THE INVENTION

The invention is based on the object of improving a method and an arrangement for controlling the data stream in a vibration-resistant playback device to the extent that increased storage of useful data in the buffer memory is made possible and the power consumption and wear during read-out of the information medium are reduced.

In the context of a method described below, this object is achieved by means of the features specified in the characterizing part. Developments and advantageous embodiments of the invention emerge from the subclaims.

In the method according to the invention, the rate at which the source data stream is read from the first memory can be switched over between a first and a second data rate. By switching over between the data rates in a variable ratio to one another, it is thus possible to simulate any desired average data rate between the first and the second data rate. The problem of downstream stages having to process a variable data rate is thus considerably reduced in that the processing stages only have to be designed for, and be capable of switching over between, two different data rates.

Furthermore, this measure creates the precondition for matching the read-out of the source data stream from the information medium to the actual average rate, which is composed of periods of time in which data can be read and periods of time in which no data can be read. The rate, resulting from the scanning speed, at which the source data from the information medium are read does not, therefore, have to be kept continually at twice the value of the normal data rate, but rather can be reduced if, for example, no vibrations occur. This results in a considerable saving of power precisely because the drive unit can be operated at a lower speed and the scanner does not have to carry out artificially initiated returns.

Since, according to the invention, the processing stages for error correction and/or masking can be switched over for two different data rates, the useful data contained in the source data stream can be subjected to error checking and possible error correction and/or masking before they are buffer-stored in the second memory. Since the check data are no longer required after error checking, correction and masking, the storage of the data stream can be restricted solely to the useful data. This results in a considerable saving of memory space or, expressed in another way, with the existing memory space, more useful data can be stored and hence a longer time span can be bridged during which no data can be read from the information medium due to vibrations.

The first memory during read-out of the source data stream and the downstream processing stages are preferably switched over between normal data rate and doubled data rate.

This selection of the data rate has the advantage that the switching-over of the processing stages is possible merely by doubling or halving the clock frequency and, therefore, can easily be implemented in existing circuit designs. The selection of the rates also suffices completely to cover the maximum range of the reading rate that is necessary in practice, the range being produced, in the event of vibrations, as a sequence of interruptions and increased reading rates, in order that a resultant average reading rate of the order of the normal data rate is obtained. The switch-over of the first memory is performed in such a way that a switch-over to the doubled data rate is made in the event of a first difference between the addresses of the first memory to which a write and a read pointer point, and a switch-over to the normal data rate is made in the event of a second difference smaller than the first difference. The measure of evaluating the difference between the write and read pointers enables a very fast reaction against overflow, so that the first memory manages with a relatively small storage capacity, which is distinctly smaller than the gain in storage capacity in the second memory by dispensing with the storage of the check data.

The data rate at which the source data stream is read from the information medium can be regulated in a continuously variable manner between normal data rate and increased data rate as a function of the occupancy of the second memory. This has the advantage that given, on average, constant ratios between periods of time in which data can be read and periods of time in which no data can be read, the reading rate can be kept at a constant value, in other words the information medium does not have to be decelerated and accelerated in the way that would be necessary given step-by-step regulation.

In this case, the maximum value of the increased data rate may be less than or equal to the doubled data rate. The maximum value is preferably 1.5 times the normal data rate. This restriction of the regulating range prevents unnecessarily high accelerations and speeds of the information medium, with the result that limiting of the power consumption is also attained by this means.

BRIEF DESCRIPTION OF THE DRAWINGS

The invention is explained below using an exemplary embodiment, which is illustrated as a block diagram in the drawing. What is involved here is a circuit arrangement for controlling the data stream in a CD playback device.

DETAILED DESCRIPTION OF THE INVENTION

Figure 1:
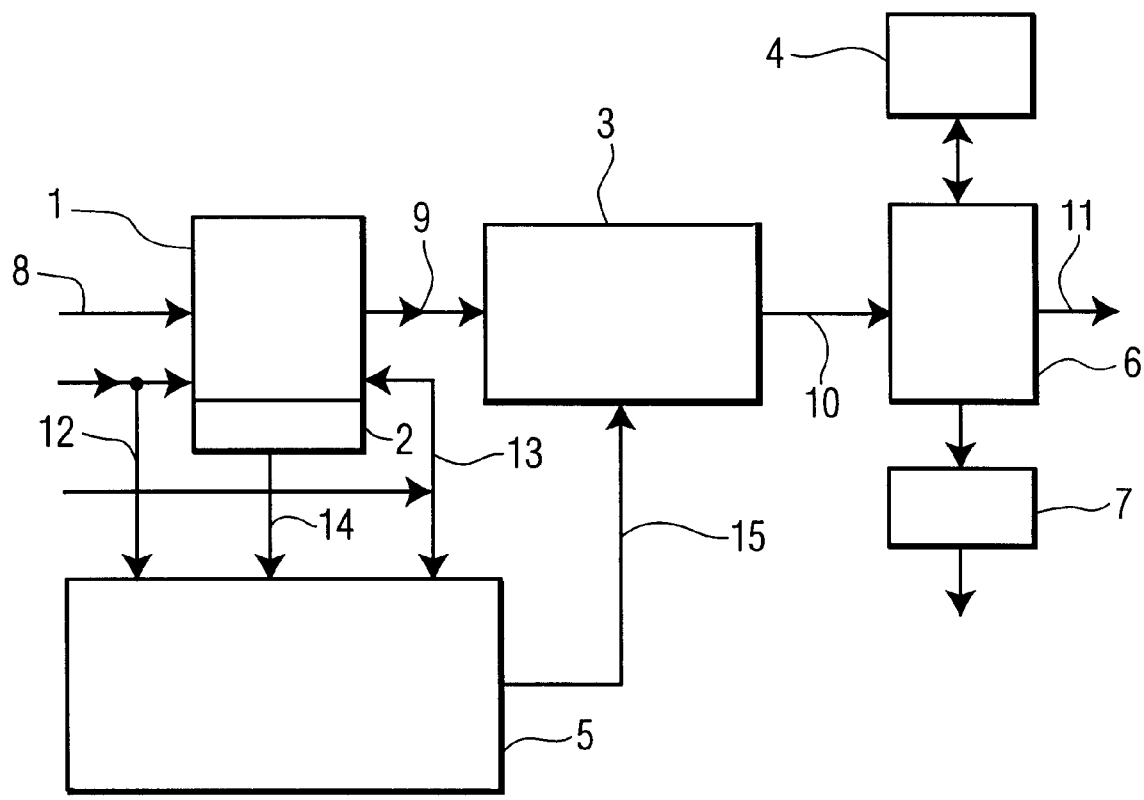

The block diagram comprises a first memory 1 with an evaluation circuit 2, an error checking, correction and masking circuit 3, a second memory 4, a circuit 5 for identifying the occupancy of the first memory 1, a circuit 6 for identifying the occupancy of the second memory 4 and a control circuit 7 for driving the drive unit.

Digital data which are read from the information medium by means of the scanner pass via a data line 8 to the first memory 1. Depending on whether data can be read from the information medium or the reading capability is interrupted by vibrations, the data rate on the data line 8 is greater than/equal to the normal data rate or equal to zero. A data rate that is higher than the normal data rate is produced when the drive is driven faster than at the normal rate, in order to compensate for gaps in the data stream again. During the read-out of the source data stream from the memory 1, a switch-over between normal and doubled data rate is made as a function of the occupancy in the memory 1, in order to keep the occupancy within two cut-off values.

Additionally connected to the first memory 1 is an evaluation circuit 2 which tests a subcode of the data blocks contained in the source data stream in order to ensure that the data blocks are read out in the correct order and, when jumps occur, the read-out is continued only when the scanner has arrived at the correct location again and has read out the succeeding data block.

With the switching-over of the read-out of the first memory 1 between normal and doubled data rate, the downstream circuit 3 for error checking, error correction and masking is also switched over. Consequently, data streams whose data rate changes over between normal and doubled data rate flow on the data lines 9 and 10. However, the data stream on the data line 9 is the source data stream, which contains useful data and check data, and the data stream on the data line 10 is an error-corrected useful data stream, which no longer contains any check data. The block length of the corresponding data on the data line 10 is thus shorter than that on the data line 9. Therefore, in the following, second memory 4, fewer memory locations need be available than would be necessary in order to store useful data and check data. Expressed in another way, with the given storage capacity of the second memory 4, more useful data can be stored and, therefore, a longer time span can be bridged during which the data stream originating from the scanner is interrupted on account of vibrations.

The circuit 6 for identifying the occupancy controls the operation of writing to the second memory 4 in such a way that the useful data stream flows at the doubled data rate and, during read-out, the useful data stream flows at the normal data rate. If the occupancy changes, then the drive of the drive unit is altered in terms of its speed by means of a control circuit 7, with the result that the reading rate is reduced or increased to a constant value with the aim of regulating the occupancy of the second memory 4.

In order to achieve rapid regulation of the occupancy of the first memory 1, provision is made of a circuit 5 for identifying the occupancy, which monitors the difference between the addresses of the write pointer 12 and of the read pointer 13. If this difference becomes too small, then the reading operation is switched over to the doubled rate just like the signal processing in the circuit 3 by means of the signal line 15. In the event of a difference that is too large, on the other hand, a switch-over to the normal data rate is made. Furthermore, the control circuit 5 receives, via the signal line 14 from the evaluation circuit 2, information as to whether the reading operation has been interrupted or data blocks are being read which do not constitute a continuation from the last data block that was identified as being correct. In this case, no data are read out.

The arrangement described makes it possible, whilst largely retaining previous circuit designs, to achieve control of the data stream in vibration-resistant playback devices as well. In the case of this design, the memory that is present in any case in playback devices for the purpose of jitter compensation is utilized to serve as a buffer memory for the source data stream and to enable control of the data stream between the normal and doubled data rates.

What is claimed is:

1. Method for controlling the data stream in a vibration-resistant playback device by writing a source data stream, which comprises information data and check data and is read from an information medium by means of a scanner, to a first memory at a data rate that varies in the event of vibrations and by reading an information data stream from a second memory at a normal data rate, error correction and/or masking of the information data contained in the source data stream being performed in processing stages before the information data stream with the normal data rate is available, comprising the steps of:

reading out the source data stream written to said first memory at a first or second data rate as a function of the filling state of the first memory;

switching downstream processing stages for error correction and/or masking of the information data to the data rate of the buffered source data stream read from the first memory;

writing a data stream containing only information data to said second memory at the first or second data rate;

controlling the source data stream read from the information medium and written to the first memory by the filling state of the second memory; and reading the information data stream from the second memory at the normal data rate.

2. Method according to claim 1, wherein the first memory during read-out of the buffered source data stream from the first memory and the downstream processing stages are switched over between normal data rate and doubled data rate.

3. Method according to claim 2, wherein a switch-over to the doubled data rate is made in the event of a first filling state of the first memory, and a switch-over to the normal data rate is made in the event of a second filling state smaller than the first filling state.

4. Method according to claim 1 wherein the data rate at which the source data stream is read from the information medium is regulated in a continuously variable manner between normal data rate and increased data rate as a function of the filling state of the second memory.

5. Method according to claim 4, wherein the maximum value of the increased data rate is less than or equal to the doubled data rate, preferably 1.5 times the normal data rate.

6. Arrangement for controlling the data stream in a vibration-resistant playback device, said arrangement comprising;

means for writing a source data stream, said data stream comprising information data and check data and being read from an information medium by means of a scanner to a first memory at a data rate that varies in the event of vibrations;

means for reading an information data stream from a second memory at a normal data rate;

processing stages connecting the first memory with the second memory for error correction and/or masking of the information data contained in the source data stream;

a first circuit means for identifying the filling state of said first memory to which the source data stream is written and for controlling the read out of a buffered data stream from said first memory at a first data rate or a second data rate as a function of the filling state of the first memory;

downstream processing stages for error correction and/or masking of the information data responsive to said first data rate of said second data rate according to the data rate of the buffered source data stream read from the first memory; and a second circuit means for identifying the filling state of the second memory and for controlling the data rate of the source data stream read from the information medium and written to the first memory dependent on the filling state of the second memory.

7. Arrangement according to claim 6, wherein said first circuit means controls the read out of the buffered data stream from said first memory at a normal data rate and a doubled data rate.

8. Arrangement according to claim 7, wherein said first circuit means controls the read out of the buffered data stream from said first memory to the doubled data rate in the event of a first filling state of the first memory and controls the read out to the normal data rate in the event of a second filling state smaller than the first filling state.

9. Arrangement according to claim 6 wherein the second memory regulates the data rate at which the source data stream is read from the information medium in a continuously variable manner between normal data rate and increased data rate as a function of the filling state of the second memory.

10. Arrangement according to claim 9, wherein the second memory regulates the maximum value of the increased data rate less than or equal to the doubled data rate, preferable to 1.5 times the normal data rate.

* * * * *